United States Patent Office 3,546,341
Patented Dec. 8, 1970

3,546,341
COMPLEXES OF 2-SUBSTITUTED BENZIMIDAZOLES AND BIS-HALOGENATED PHENOLS IN ANTHELMINTIC COMPOSITIONS AND METHODS
Raymond J. La Pierre, Iselin, N.J., assignor to Merck & Co., Inc., Rahway, N.J., a corporation of New Jersey
No Drawing. Application Feb. 18, 1966, Ser. No. 528,382, now Patent No. 3,475,444, dated Oct. 28, 1969, which is a continuation-in-part of application Ser. No. 336,342, Jan. 8, 1964. Divided and this application Feb. 19, 1969, Ser. No. 828,405
Int. Cl. A61k 27/00
U.S. Cl. 424—270                    12 Claims

ABSTRACT OF THE DISCLOSURE

Complexes of certain 2-substituted benzimidazoles and bis-halogenated phenols are prepared by reacting a 2-substituted benzimidazole with a bis-halogenated phenol. Compositions active as anthelmintics, in which a 2-substituted benzimidazole-bis-halogenated phenol complex is the active ingredient, are provided.

This a division of application Ser. No. 528,382 filed Feb. 18, 1966 which issued with Pat. No. 3,475,444 on Oct. 28, 1969, which in turn is a continuation-in-part application of application Ser. No. 336,342 filed Jan. 8, 1964 and now abandoned.

This invention relates to novel chemical compounds and more particularly to complexes of certain 2-substituted benzimidazoles with certain bis-halogenated phenols. Specifically, it relates to novel 2-substituted benzimidazole-2,2'-thio- or sulfinyl-bis(halogenated phenol) complexes, processes for preparing them, and compositions containing them.

The novel complexes of the present invention are discrete chemical compounds and may be represented by the following structural formula:

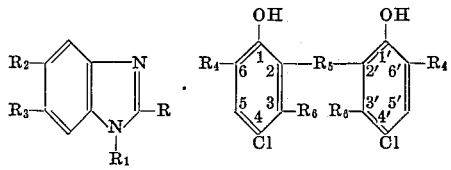

where R is thiazolyl, isothiazolyl, thiadiazolyl, pyrryl, furyl, thienyl or phenyl, $R_1$ is hydrogen, lower alkyl or alkenyl, $R_2$ and $R_3$ are hydrogen, lower alkyl, lower alkoxy or trifluoromethyl, $R_4$ is halogen or nitro, $R_5$ is —S— or —SO—, and $R_6$ is hydrogen, chloro or lower alkyl such as methyl, ethyl, propyl, butyl and the like.

The novel compounds are equimolar complexes and possess distinctly different characteristics from their component parts; they are not mere mixtures of the benzimidazole compound and the phenol compound. Representative of the compounds within the scope of the invention, expressed for the sake of convenience as "benzimidazole portion·phenol portion" are:

2-(4'-thiazolyl)benzimidazol·2,2'-thiobis-(4,6-dichlorophenol),
2-(4'-thiazolyl)benzimidazole·2,2'-sulfinyl-(4,6-dichlorophenol),
2-(4'-thiazolyl)benzimidazole·2,2'-thiobis(3-methyl-4,6-dichlorophenol),
2-(4'-thiazolyl)benzimidazole·2,2'-thiobis-(4-chloro-6-nitrophenol),
2-(4'-thiazolyl)benzimidazole·2,2'-sulfinylbis-(3-methyl-4,6-dichlorophenol),
2-(4'-thiazolyl)benzimidazole·2,2'-thiobis-(3,4,6-trichlorophenol),
1-methyl-2-(4'-thiazolyl)benzimidazole·2,2'-thiobis-(4,6-dichlorophenol),
2-(4'-thiazolyl)benzimidazole·2,2'-sulfinylbis-(3,4,6-trichlorophenol),
2-(2'-thiazolyl)benzimidazole·2,2'-thiobis-(4,6-dichlorophenol),
2-(2'-thiazolyl)benzimidazole·2,2'-thiobis-(3-ethyl-4,6-dichlorophenol),
2-(2'-thiazolyl)benzimidazole·2,2'-thiobis-(3,4,6-trichlorophenol),
2-(2'-thiazolyl)benzimidazole·2,2'-sulfinylbis-(4,6-dichlorophenol),
2-(2'-thiazolyl)benzimidazole·2,2'-thiobis-(4-chloro-6-nitrophenol),
2-(2'-thiazolyl)benzimidazole·2,2'-sulfinylbis-(3,4,6-trichlorophenol),
2-(2'-thiazolyl)benzimidazole·2,2'-sulfinylbis-(4,6-dichlorophenol),
2-phenyl benzimidazole·2,2'-thiobis-(4,6-dichlorophenol),
2-phenyl benzimidazole·2,2'-sulfinylbis-(3-ethyl-4,6-dichlorophenol),
2-phenyl benzimidazole·2,2'-thiobis-(4-chloro-6-nitrophenol),
2-phenyl benzimidazole·2,2'-thiobis-(3,4,6-trichlorophenol),
2-phenyl benzimidazole·2,2'-sulfinylbis-(4,6-dichlorophenol),
2-phenyl benzimidazole·2,2'-sulfinylbis-(3,4,6-trichlorophenol),
2-(2'-pyrryl)benzimidazole·2,2'-thiobis-(4,6-dichlorophenol),
2-(2'-pyrryl)benzimidazole·2,2'-thiobis-(4-chloro-6-nitrophenol),
2-(2'-pyrryl)benzimidazole·2,2'-thiobis-(3-methyl-4,6-dichlorophenol),
2-(2'-pyrryl)benzimidazole·2,2'-thiobis-(3,4,6-trichlorophenol),
2-(2'-pyrryl)benzimidazole·2,2'-sulfinylbis-(4,6-dichlorophenol),
2-(2'-furyl)benzimidazole·2,2'-thiobis-(4,6-dichlorophenol),
2-(2'-furyl)benzimidazole·2,2'-thiobis-(4-chloro-6-nitrophenol),
2-(2'-furyl)benzimidazole·2,2'-thiobis-(3,4,6-trichlorophenol),
2-(2'-thienyl)benzimidazole·2,2'-thiobis-(4,6-dichlorophenol),
2-(2'-thienyl)benzimidazole·2,2'-thiobis-(4-chloro-6-nitrophenol),
2-(2'-thienyl)benzimidazole·2,2'-thiobis-(3,4,6-trichlorophenol),
2-(3'-thienyl)benzimidazole·2,2'-thiobis-(4,6-dichlorophenol),
2-(3'-thienyl)benzimidazole·2,2'-thiobis-(4-chloro-6-nitrophenol),
2-(4'-thiazolyl)-5-methyl benzimidazole·2,2'-thiobis-(4,6-dichlorophenol),
2-(4'-thiazolyl)-5-methyl benzimidazole·2,2'-thiobis-(3,4,6-trichlorophenol),
2-(4'-thiazolyl)-5-trifluoromethyl benzimidazole·2,2'-thiobis(4,6-dichlorophenol),
2-(4'-thiazolyl)-5-trifluoromethyl benzimidazole·2,2'-sulfinylbis(3,4,6-trichlorophenol),
2-(2'-thiazolyl)-5,6-dimethyl benzimidazole·2,2'-thiobis-(4,6-dichlorophenol),
2-(2'-thiazolyl)-5,6-dimethyl benzimidazole·2,2'-thiobis-(3,4,6-trichlorophenol), 2-phenyl-5-methoxy benzimidazole·2,2'-thiobis-
(4,6-dichlorophenol),
2-(3'-isothiazolyl)benzimidazole·2,2'-thiobis-
(4-chloro-6-nitrophenol),
2-(4'-1',2',3'-thiadiazolyl)benzimidazole·2,2'-thiobis-
(4-chloro-6-nitrophenol),
2-(4'-thiazolyl)-5-methoxy benzimidazole·2,2'-thiobis-
(4,6-dichlorophenol),
2-(4'-thiazolyl)-5-methoxy benzimidazole·2,2'-sulfinylbis-
(4,6-dichlorophenol),
and 2-(3'-thienyl)-5,6-dimethoxy benzimidazole·2,2'-
thiobis(4,6-dichlorophenol).

Preferred among the foregoing are:

2-(4'-thiazolyl)benzimidazole·2,2'-thiobis(4,6-
dichlorophenol),
2-(4'-thiazolyl)benzimidazole·2,2'-sulfinylbis(4,6-
dichlorophenol),
2-(4'-thiazolyl)benzimidazole·2,2'-sulfinylbis(3-methyl-
4,6-dichlorophenol),
2-(4'-thiazolyl)benzimidazole·2,2'-thiobis(3,4,6-
trichlorophenol),
2-(4'-thiazolyl)benzimidazole·2,2'-thiobis(3-methyl-
4,6-dichlorophenol)
2-(4'-thiazolyl)benzimidazole·2,2'-sulfinylbis(3,4,6-
trichlorophenol),
2-(4'-thiazolyl)benzimidazole·2,2'-thiobis(4-chloro-6-
nitrophenol),
2-(2'-thiazolyl)benzimidazole·2,2'-thiobis(4,6-
dichlorophenol),
2-(2'-thiazolyl)benzimidazole·2,2'-thiobis(3,4,6-
trichlorophenol),
2-(2'-thiazolyl)benzimidazole·2,2'-sulfinylbis(3,4,6-
trichlorophenol),
2-(2'-thiazolyl)benzimidazole·2,2'-thiobis (4-chloro-6-
nitrophenol),
2-phenyl benzimidazole·2,2'-thiobis (4,6-
dichlorophenol),
2-phenyl benzimidazole·2,2'-thiobis(3,4,6-
trichlorophenol),
2-phenyl benzimidazole·2,2'-sulfinylbis(4,6-
dichlorophenol),
2-phenyl benzimidazole·2,2'-sulfinylbis(3,4,6-
trichlorophenol),
2-phenyl benzimidazole·2,2'-thiobis(4-chloro-6-
nitrophenol),
2-(2'-pyrryl)benzimidazole·2,2'-thiobis(4,6-
dichlorophenol),
2-(2'-pyrryl)benzimidazole·2,2'-thiobis(3,4,6-
trichlorophenol),
2-(2'-furyl)benzimidazole·2,2'-thiobis(4,6-
dichlorophenol),
2-(2'-furyl)benzimidazole·2,2'-thiobis(3,4,6-
trichlorophenol),
2-(2'-thienyl)benzimidazole·2,2'-thiobis(4,6-
dichlorophenol),
2-(3'-thienyl)benzimidazole·2,2'-thiobis(4,6-
dichlorophenol), and
2-(4'-thiozolyl)-5-methyl benzimidazole·2,2'-thiobis(4,6-
dichlorophenol, and most preferred are
2-(4'-thiazolyl)benzimidazole·2,2'-thiobis(4,6-
dichlorophenol),
2-(4'-thiazolyl)benzimidazole·2,2'-sulfinylbis(4,6-
dichlorophenol),
2-(4'-thiazolyl)benzimidazole·2,2'-thiobis(3,4,6-
trichlorophenol),
2-(4'-thiazolyl)benzimidazole·2,2'-sulfinylbis(3,4,6-
trichlorophenol),
2-(4'-thiazolyl)benzimidazole·2,2'-sulfinylbis(3-methyl-
4,6-dichlorophenol),
2-(4'-thiazolyl)benzimidazole·2,2'-thiobis(3-methyl-
4,6-dichlorophenol),
2-(2'-thiazolyl)benzimidazole·2,2'-thiobis(4,6-
dichlorophenol),
2-(2'-thiazolyl)benzimidazole·2,2'-thiobis(3,4,6-
trichlorophenol),
2-phenyl benzimidazole·2,2'-thiobis(4,6-
dichlorophenol),
2-phenyl benzimidazole·2,2'-thiobis(3,4,6-
trichlorophenol),
2-(2'-pyrryl)benzimidazole·2,2'-thiobis(4,6-
dichlorophenol),
2-(2'-pyrryl)benzimidazole·2,2'-thiobis(3,4,6-
trichlorophenol),
2-(2'-furyl)benzimidazole·2,2'-thiobis(4,6-
dichlorophenol),
2-(2'-furyl)benzimidazole·2,2'-thiobis(3,4,6-
trichlorophenol), and
2-(3'-thienyl)benzimidazole·2,2'-thiobis(4,6-
dichlorophenol).

The novel compounds of the invention are prepared by
reacting a benzimidazole of the formula

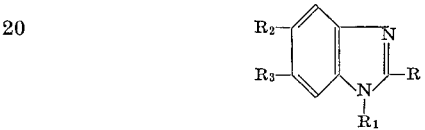

with a bis-halogenated phenol of the formula

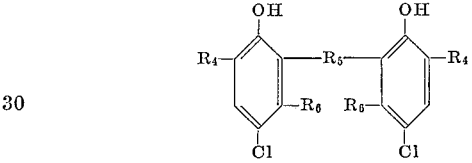

where R, $R_1$, $R_2$, $R_3$, $R_4$, $R_5$, and $R_6$ are as previously
assigned. In general, the reaction may be effected by
mixing the reactants in a suitable solvent, and heating the
mixture if necessary to effect solution. Solvents such
as methanol, ethanol, propanol, butanol, acetone, and the
like may be employed with methanol being preferred.
The product can be recovered by cooling the reaction
mass to a point where the product crystallizes from
solution.

It is preferred to use an excess of the bisphenol com-
pound in the reaction medium over the stoichiometric
amount since these are generally more soluble than the
benzimidazole compounds. Such excesses of bisphenol
compound, however, are not critical and equimolar
amounts or excesses of the benzimidazole reactant may
be used if desired.

The temperature of the reaction is not critical. The
particular temperature employed will depend to a large
extent on the reactants employed and on the solvents
used. The preferred reactant temperature is the reflux
temperature of the solvent system employed. Once solu-
tion has been effected, as indicated by clarification of
the reaction mass, the product, the complex between
the benzimidazole compound and the bis-halogenated
compound, may be crystallized from solution by cooling
the reaction mass, preferably to a temperature some-
what below room temperature. Values in the range of
from 0°–15° C. are suitable for this purpose. The product
may then be washed and dried in accordance with known
techniques.

The compounds of the present invention have utility
in the field of animal therapy. They are highly effective
anthelmintics and are effective against a wide spectrum
of helminths. For example, they are effective against
roundworm and tapeworm and flukes in such animals
as sheep, cattle, goats, horses, and mules, the actual
degree of anthelmintic activity depending upon the par-
ticular complex. For effective treatment certain dosage
levels are desired, depending upon the complex em-
ployed, the type of animal, and the particular helminth
being combatted. For the complexes 2-(4'-thiazolyl)benzimidazole·2,2'-thiobis(4,6-
dichlorophenol), 2-(4'-thiazolyl)benzimidazole·2,2'-thiobis(3,4,6-trichlorophenol), 2-(4'-thiazolyl)benzimidazole·2,2'-sulfinylbis(4,6-dichlorophenol), 2-(4'-thiazolyl)benzimidazole·2,2'-sulfinylbis(3,4,6-trichlorophenol), 2-(2'-thiazolyl)benzimidazole·2,2'-thiobis(4,6-dichlorophenol), 2-(2'-thiazolyl)benzimidazole·2,2'-thiobis(3,4,6-trichlorophenol), 2-(2'-pyrryl)benzimidazole·2,2'-thiobis(4,6-dichlorophenol), 2-(2'-pyrryl)benzimidazole·2,2'-thiobis(3,4,6-trichlorophenol), 2-(2'-furyl)benzimidazole·2,2'-thiobis(4,6-dichlorophenol), 2-(2'-furyl)benzimidazole·2,2'-thiobis(3,4,6-trichlorophenol), and 2-(3'-thienyl)benzimidazole·2,2'-thiobis(4,6-dichlorophenol), effective roundworm, tapeworm and fluke efficacy is achieved when the complex is administered at dosage levels of from 65 to 425 mg./kg. For the complexes 2-phenyl benzimidazole·2,2'-thiobis(4,6-dichlorophenol) and 2-phenyl benzimidazole·2,2'-thiobis(3,4,6-trichlorophenol), good tapeworm and fluke efficacy is obtained at the above dosage level.

The compounds of the present invention may be administered in a variety of ways, depending upon the particular animal employed, the type of anthelmintic treatment normally given to such an animal, the materials employed, and the particular helminths being combatted. Irrespective of the method of treatment, the complexes of the present invention may be admixed with any inert carrier and administered to the animal. A convenient range of active ingredients in the composition is from 0.001%–95% by weight, based on the total weight of the composition. The actual amount of complex included will, as above stated, depend upon the particular mode of treatment. Thus, where the treatment involves admixing the active ingredient with an animal's feed, and is prophylactic, the amount of material may suitably range between 0.001%–3.0% by weight with the carrier being an element of the animal's nutrition. Where the feeding method is employed therapeutically, the composition may contain from 0.05%–25% of the complex, based on the total weight of the feed.

When the method of treatment involves using unit dosage forms such as tablets, boluses, or a liquid drench, the active ingredient may suitably range from about 5–95% based on the total weight of the composition with a range of from 5–80% being suitable for the solid dosage forms, a range of from 30–95% of dry dispersible powder suitable for forming the liquid drench, and a range of from 10–50% for the final liquid drench form.

Additionally, the complexes of the present invention may be admixed with orally ingestible carriers for subsequent admixing into the animal's feed. These are normally termed feed premixes or supplements and they conveniently contain from about 5–50% by weight of the complex material.

The following examples are given for purposes of illustration only and are not intended to limit the scope of the present invention.

EXAMPLE 1

2 g. of 2-(4'-thiazolyl)benzimidazole and 4 g. of 2,2'-thiobis(4,6-dichlorophenol) are mixed in 100 cc. of methanol. The reaction mixture is brought to a reflux temperature of about 64° C. and is held there until the solution is complete, a period of about 5 minutes. The reaction mass is then cooled over night at a temperature of 4° C. The product, 2-(4'-thiazolyl)benzimidazole·2,2'-thiobis(4,6-dichlorophenol) crystallizes in the form of slightly colored crystals. It is then filtered and dried at 50° C. in an oven drier.

When equivalent amounts of 2-(2'-thiazolyl)benzimidazole, 2-phenyl benzimidazole, 2-(2'-pyrryl)benzimidazole, 2-(2'-furyl)benzimidazole, 2-(3'-thienyl)benzimidazole, 1-methyl-2-(4'-thiazolyl)benzimidazole, 2-(4'-thiazolyl)-5-methyl benzimidazole, 2-(4'-thiazolyl)-5-trifluoromethylbenzimidazole and 2-(3'-thienyl)-5,6-dimethoxy benzimidazole are substituted for the 2-(4'-thiazolyl)benzimidazole in the foregoing procedure, the corresponding complex is formed.

When the 2,2'-thiobis(4,6-dichlorophenol) is replaced with an equivalent amount of 2,2'-thiobis(4-chloro-6-nitrophenol) in the above procedure, the corresponding complex is obtained.

Similar results are obtained when the methanol in the foregoing procedure is replaced with ethanol, propanol, butanol, or acetone and the reaction mass is heated to the reflux temperature of the system.

EXAMPLE 2

A suspension of 7.9 g. (0.0179 mole) of 2,2'-sulfinylbis(3,4,6-trichlorophenol and 2.69 g. (0.013 mole) of 2-(4'-thiazolyl)benzimidazole in 250 ml. of methanol is refluxed over night. Undissolved 2-(4'-thiazolyl)benzimidazole (1.17 g.) is removed by filtration and the filtrate is concentrated to a residual volume of about 50 ml. via atmospheric distillation. The resulting slurry is cooled to 0° C., aged briefly, filtered, washed with a little methanol and air dried. 2.7 g. of the product, 2-(4'-thiazolyl)benzimidazole·2,2'-sulfinylbis(3,4,6-trichlorophenol), M.P. 191° C., are obtained. X-ray studies and U.V. absorption characteristics indicate that the product is a discrete compound having a 1:1 molar ratio of the constituent reactants.

When the above procedure is repeated using an equivalent amount of 2,2'-sulfinylbis(3-methyl-4,6-dichlorophenol) or 2,2'-sulfinylbis(4,6-dichlorophenol) in place of the 2,2'-sulfinylbis(3,4,6-trichlorophenol), the corresponding complex is obtained.

When equivalent amounts of 2-(2'-thiazolyl)benzimidazole, 2-phenyl benzimidazole, 2-(2'-pyrryl)benzimidazole, 2-(2'-furyl)benzimidazole, 2-(3'-thienyl)benzimidazole, 1-methyl-2-(4'-thiazolyl)benzimidazole, 2-(4'-thiazolyl)-5-methyl benzimidazole, 2-(4'-thiazolyl)-5-trifluoromethyl benzimidazole and 2-(3'-thienyl)-5,6-dimethoxy benzimidazole are substituted for the 2-(4'-thiazolyl)benzimidazole in the foregoing procedure, the corresponding complex is formed.

EXAMPLE 3

A suspension of 42.5 g. (0.1 mole) of 2,2'-thiobis(3,4,6-trichlorophenol) and 10.0 g. (0.05 mole) of 2-(4'-thiazolyl)benzimidazole in 1.5 l. of methanol is refluxed briefly to effect solution, concentrated to about one-half initial volume, filtered to clarify and the filtrate cooled over night at 0° C. The resulting crystalline mass is filtered, the cake washed with 2×50 ml. of cold methanol and then dried atmospherically. The product, 2-(4'-thiazolyl)benzimidazole·2,2'-thiobis(3,4,6-trichlorophenol), M.P. 203–204.5° C., is obtained in the form of small needles. X-ray studies and U.V. absorption characteristics indicate that the product is a discrete compound having a 1:1 molar complex of the constituent reactants.

When the above procedure is repeated using an equivalent amount of 2,2'-thiobis(3-methyl-4,6-dichlorophenol) in place of the 2,2'-thiobis(3,4,6-trichlorophenol), the corresponding complex is obtained.

When equivalent amounts of 2-(2'-thiazolyl)benzimidazole, 2-phenyl benzimidazole, 2-(2'-pyrryl)benzimidazole, 2-(2'-furyl)benzimidazole, 2-(3'-thionyl)benzimidazole, 1-methyl-2-(4'-thiazolyl)benzimidazole, 2-(4'-thiazolyl)-5-methyl benzimidazole, 2-(4'-thiazolyl)-5-trifluoromethyl benzimidazole and 2-(3'-thienyl)5,6-dimethoxy benzimidazole are substituted for the 2-(4'-thiazolyl) benzimidazole in the foregoing procedure, the corresponding complex is formed.

EXAMPLE 4

A total of 66 g. of the complex 2-(4'thiazolyl)benzimidazole·2,2'thiobis(4,6 - dichlorophenol) obtained from Example 1 is suspended in one quart of water along with the following ingredients:

|  | G. |
| --- | --- |
| Polysorbate 80; polyoxyethylene (20) sorbitan monooleate (Tween 80; available from Atlas Chem. Co.) | 0.4 |
| Sorbitan monolaurate (Span 20; available from Atlas Chem. Co.) | 0.4 |
| Pregelatinized starch | 39.2 |

The total volume of the drench obtained after one quart of water is added in 33 fluid ounces. Two groups of two sheep each, naturally infected with nemotodes of the following genera, are selected: Haemonchus, Oatertagia, Trichostrongylus, Cooperia, Stronglyoides, Nematodirus, and Oesophagostomum. One group serves as a control group and does not receive treatment. The drench is administered in a dosage equivalent to provide 138 mg. of the complex per kg. of animal body weight. The fecal egg counts are obtained on both the untreated controls and the treated animals, before and after treatment. The following table shows the results obtained.

| | | | Fecal nematode egg count (E.P.G.),[1] days | | | | | |
| --- | --- | --- | --- | --- | --- | --- | --- | --- |
| | | | Pretreatment | | Post-treatment | | | |
| Medication | Dosage, mg./kg. | Sheep No. | −3 | 0 | 2 | 3 | 6 | 7 |
| ([2]) | 138 | 2,176 | 252 | 332 | 4 | 2 | <2 | <2 |
| ([2]) | 138 | 2,188 | 730 | 728 | <2 | <2 | <2 | <2 |
| None | 6 | 2,118 | 908 | 536 | 664 | 344 | 306 | 308 |
| None | 0 | 2,166 | 906 | 326 | 204 | 12 | 166 | 194 |

[1] Eggs per gram feces.
[2] 2-(4'-thiazolyl)benzimidazole-2,2'-thiobis(4,6-dichlorophenol).

It will be observed from the above table that within 48 hours after treatment one treated sheep had an undetectable nemotode egg count, while another sheep had an E.P.G. of only 4, whereas the untreated controls maintain a detectable egg count throughout the one-week post-treatment period.

EXAMPLE 5

Three sheep weighing 51, 41, and 45 kg. and naturally infected with the tapeworm Moniezia expansa as determined by pretreatment fecal examination, are treated with a drench containing the complex 2-(4'-thiazolyl)-benzimidazole·2,2'-thiobis(4,6-dichlorophenol) prepared from the formulation of Example 1 at a dosage level of 138 mg. of complex per kg. of body weight. At necropsy, four days after treatment, the small intestine of each sheep is examined for proglottids and scolices of Moniezia and none is found.

EXAMPLE 6

Four groups of rats are experimentally infected with the sheep liver fluke Fasciola hepatica and kept on a normal diet. The infection is allowed to proceed on a natural course for the period of time indicated in the table below. The rats are then treated with a single oral dose of the complex 2 - (4' - thiazolyl)benzimidazole·2,2' - thiobis-(3,4,6-trichlorophenol) in an aqueous suspension containing 2% methyl cellulose. The medicament is administered at a level of 50 mg./kg. of animal body weight. About 5 days after treatment the rats are necropsied and their bile ducts examined for the extent of infection. The results are summarized in the table below:

| Rat | Age of infection at treatment, weeks | Approximate weight of rat at treatment, gm. | Therapeutic response |
| --- | --- | --- | --- |
| 1 | 12 | 450 | Died. |
| 2 | 12 | 450 | Complete.[1] |
| 3 | 12 | 450 | Do.[1] |
| 4 | 12 | 450 | Do.[1] |
| 5 | 2 | 250 | Do.[1] |
| 6 | 2 | 250 | Do.[1] |
| 7 | 5 | 230 | Do.[1] |

[1] Designation given when all liver fluke present in bile duct are dead.

It will be appreciated by those skilled in the art that the infections in rates 5, 6 and 7 are immature at the time of treatment, an extremely intractable stage. The complete therapeutic response therefore in these animals is noteworthy.

EXAMPLE 7

A formulation containing the following ingredients is prepared and brought up to 976 ml. volume with water:

2-(4'-thiazolyl)benzimidazole.
2,2'-sulfinylbis(4,6-thiochlorophenol)—190 g.
Pre-gelatinized starch—30 g.
Polysorbate 80; polyoxoethylene (20) sorbitan monooleate (Tween 80; available from Atlas Chem. Co.)—50 mg.
Sorbitan monolaurate (Span 20; available from Atlas Chem. Co.)—50 mg.
Antifoam A (dimethyl polysiloxane emulsion available from Dow-Corning Corp.)—Trace.
Sodium benzoate—0.1%.

Each ounce of the above formulation contains 5.71 g. of complex. This formulation is administered in a single oral dose to each of four sheep naturally infected with nematodes including Trichostrongylua, Oatertagia, and Cooperia at the dosage level indicated in the table below. Dosages are indicated in terms of the amount of complex supplied. Fecal egg counts are made about 7 days after treatment. The results are tabulated below:

| | | Fecal nematode egg count (eggs per gm.), days | | |
| --- | --- | --- | --- | --- |
| | | Pretreatment | | Post-treatment |
| Dosage (mg./kg.) | Sheep No. | −4 | 0 | 7 |
| 308 | 2,479 | 190 | 146 | 0 |
| 308 | 2,491 | 138 | 232 | 0 |
| 616 | 2,388 | 252 | 264 | 0 |
| 616 | 2,395 | 302 | 256 | 0 |

As can be seen from the above table, egg counts drop to zero within 7 days after treatment, thus showing a complete therapeutic response to the medicament.

What is claimed is:

1. An anthelmintic compositon comprising a compound of the formula:

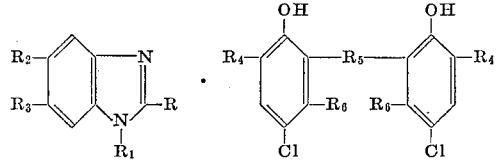

as the active ingredients where R is selected from the group consisting of thiazolyl, isothiazolyl, thiadiazolyl, pyrryl, furyl, thienyl and phenyl, $R_1$ is selected from the group consisting of hydrogen, loweralkyl and alkenyl, $R_2$ and $R_3$ are selected from the group consisting of hydrogen, loweralkyl, loweralkoxy and trifluoromethyl, $R_4$ is selected from the group consisting of halogen and nitro, $R_5$ is selected from the group consisting of —S— and —SO—, and $R_6$ is selected from the group consisting of hydrogen, chloro and loweralkyl, and an inert carrier wherein the active ingredient is present in an amount ranging from 0.001% to 95% by weight.

2. The composition according to claim 1 wherein R is 4'-thiazolyl, and $R_1$, $R_2$ and $R_3$ are hydrogen.

3. The composition according to claim 2 wherein the compound is 2-(4'-thiazolyl)benzimidazole·2,2'-thiobis-(4,6-dichlorophenol).

4. The composition according to claim 2 wherein the compound is 2-(4'-thiazolyl)benzimidazole·2,2'-sulfinylbis(4,6-dichlorophenol).

5. The composition according to claim 2 wherein the compound is 2-(4'-thiazolyl)benzimidazole·2,2'-thiobis-(3,4,6-trichlorophenol).

6. The composition according to claim 2 wherein the compound is 2-(4'-thiazolyl)benzimidazole·2,2'-sulfinyl-bis-(3,4,6-trichlorophenol).

7. The method for treating helminthiasis which comprises orally administering to an animal an effective amount of a compound of the formula

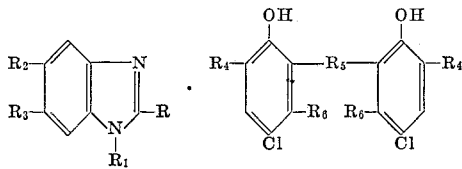

where R is selected from the group consisting of thiazolyl, isothiazolyl, thiadiazolyl, pyrryl, furyl, thienyl, and phenyl, $R_1$ is selected from the group consisting of hydrogen, lower alkyl and alkenyl, $R_2$ and $R_3$ are selected from the group consisting of hydrogen, lower alkyl, lower alkoxy, and trifluoromethyl, $R_4$ is selected from the group consisting of halogen and nitro, $R_5$ is selected from the group consisting of —S— and —SO—, and $R_6$ is selected from the group consisting of hydrogen, chloro, and lower alkyl.

8. The method according to claim 7 wherein R is 4'-thiazolyl and $R_1$, $R_2$ and $R_3$ are hydrogen.

9. The method according to claim 7 wherein the compound is 2-(4'-thiazolyl)benzimidazole·2,2'-thiobis(4,6-dichlorophenol).

10. The method according to claim 7 wherein the compound is 2-(4'-thiazolyl)benzimidazole·2,2'-sulfinylbis-(4,6-dichlorophenol).

11. The method according to claim 7 wherein the compound is 2-(4'-thiazolyl)benzimidazole·2,2'-thiobis-(3,4,6-trichlorophenol).

12. The method according to claim 7 wherein the compound is 2-(4'-thiazolyl)benzimidazole·2,2'-sulfinylbis-(3,4,6-trichlorophenol).

References Cited

UNITED STATES PATENTS

| | | | |
|---|---|---|---|
| 2,857,391 | 10/1958 | Engelhardt | 260—309.2 |
| 2,891,070 | 6/1959 | Ledrut | 260—311 |
| 3,017,415 | 1/1962 | Sarett | 260—302 |
| 3,152,041 | 10/1964 | Gillingham | 424—273 |
| 3,162,574 | 12/1964 | Forsyth | 260—302 |
| 3,202,575 | 8/1965 | Kruyt | 424—273 |

STANLEY J. FRIEDMAN, Primary Examiner

U.S. Cl. X.R.

424—273